(12) United States Patent
Yan et al.

(10) Patent No.: US 11,966,539 B2
(45) Date of Patent: Apr. 23, 2024

(54) METHOD AND DEVICE FOR ADJUSTING TOUCH CAPACITANCE DATA, ELECTRONIC DEVICE, AND STORAGE MEDIUM

(71) Applicant: Chipone Technology (Beijing) Co., Ltd., Beijing (CN)

(72) Inventors: Junchao Yan, Beijing (CN); Peng Jiang, Beijing (CN)

(73) Assignee: CHIPONE TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 17/923,575

(22) PCT Filed: Dec. 17, 2020

(86) PCT No.: PCT/CN2020/137359
§ 371 (c)(1),
(2) Date: Nov. 5, 2022

(87) PCT Pub. No.: WO2021/223447
PCT Pub. Date: Nov. 11, 2021

(65) Prior Publication Data
US 2023/0185405 A1 Jun. 15, 2023

(30) Foreign Application Priority Data
May 6, 2020 (CN) .......................... 202010375902.9

(51) Int. Cl.
*G06F 3/041* (2006.01)
*G06F 3/044* (2006.01)

(52) U.S. Cl.
CPC ........ *G06F 3/0418* (2013.01); *G06F 3/04186* (2019.05); *G06F 3/044* (2013.01)

(58) Field of Classification Search
CPC ............... G06F 3/0418; G06F 3/04182; G06F 3/04186; G06F 3/044
See application file for complete search history.

(56) References Cited

U.S. PATENT DOCUMENTS 6,307,436 B1 10/2001 Hau
7,567,240 B2 * 7/2009 Peterson, Jr. ......... G06F 3/0444
345/173

(Continued)

FOREIGN PATENT DOCUMENTS

CN 105630254 6/2016
CN 107624176 1/2018

(Continued)

*Primary Examiner* — Darlene M Ritchie
(74) *Attorney, Agent, or Firm* — Treasure IP Group, LLC (57) ABSTRACT

Disclosed is a method and a device for adjusting a touch capacitance data, an electronic device and a storage medium. The method comprises: acquiring the touch capacitance data; calculating a variation of a compensation capacitance value required to adjust the touch capacitance data to a target value according to a configured compensation step value; judging whether the touch capacitance data is in a nonlinear range; according to the judgment result, performing a corresponding compensation operation with the variation of the compensation capacitance value. The method enables the touch capacitance data to be automatically adjusted to being close to the target value, thus improving the accuracy of adjusting the touch capacitance data.

13 Claims, 5 Drawing Sheets

(56) References Cited

U.S. PATENT DOCUMENTS

| | | | | |
|---|---|---|---|---|
| 8,629,852 | B2* | 1/2014 | Kwon | G06F 3/0445 |
| | | | | 345/174 |
| 9,128,570 | B2* | 9/2015 | Vallis | G06F 3/0418 |
| 2007/0257890 | A1* | 11/2007 | Hotelling | G06F 3/04182 |
| | | | | 345/173 |
| 2011/0109585 | A1* | 5/2011 | Kwon | G06F 3/0445 |
| | | | | 345/174 |
| 2012/0200524 | A1* | 8/2012 | Vallis | G01R 35/005 |
| | | | | 324/613 |
| 2015/0042597 | A1* | 2/2015 | Wang | G06F 3/044 |
| | | | | 345/87 |
| 2016/0259479 | A1* | 9/2016 | Kang | G06F 3/0418 |
| 2017/0031519 | A1* | 2/2017 | Luong | G06F 3/0418 |
| 2018/0081475 | A1* | 3/2018 | Park | G06F 3/0412 |
| 2019/0042050 | A1* | 2/2019 | Jin | G06F 3/044 |
| 2020/0241665 | A1* | 7/2020 | Fu | G06F 3/04166 |
| 2022/0004284 | A1* | 1/2022 | Vu | G06F 3/0416 |

FOREIGN PATENT DOCUMENTS

| | | |
|---|---|---|
| CN | 107957804 | 4/2018 |
| CN | 108073329 | 5/2018 |
| CN | 101221479 | 7/2018 |
| CN | 111522469 | 8/2020 |
| JP | 2020184258 A | 11/2020 |

* cited by examiner

METHOD AND DEVICE FOR ADJUSTING TOUCH CAPACITANCE DATA, ELECTRONIC DEVICE, AND STORAGE MEDIUM

CROSS-REFERENCE TO RELATED APPLICATION

The present disclosure is a Section 371 National Stage application of International Application No. PCT/CN2020/137359, which is filed on 17 Dec. 2020 and published as WO 2021/223447 A1 on 11 Nov. 2021, and claims priority to a Chinese patent application No. 202010375902.9, filed on May 6, 2020, entitled "METHOD AND DEVICE FOR ADJUSTING TOUCH CAPACITANCE DATA, ELECTRONIC DEVICE AND STORAGE MEDIUM", the entire contents of which are incorporated herein by reference in their entireties.

FIELD OF THE DISCLOSURE

The present disclosure relates to a field of touch control technology, in particular to a method and device for adjusting a touch capacitance data, an electronic device and a storage medium.

DESCRIPTION OF THE RELATED ART

In a touch device, a plurality of touch capacitance data, which are acquired by a plurality of touch sensors on the touch panel before the touch panel is touched, should be adjusted to a unified value, so as to ensure that the plurality of touch capacitance data acquired when a touch occurs have a unified reference value and ensure the accuracy of touch sensing.

In an existing method, compensation capacitance values of the touch sensors are adjusted directly and linearly, but the relationship between the compensation capacitance values and the plurality of touch capacitance data is nonlinear, so this adjustment method is limited and the accuracy of adjusting the plurality of touch capacitance data cannot be guaranteed.

SUMMARY

According to an embodiment of the present disclosure, a method for adjusting a touch capacitance data is provided, and comprises:
  acquiring the touch capacitance data;
  calculating a variation, which is required to adjust the touch capacitance data to a target value, of a compensation capacitance value, according to a configured compensation step value;
  judging whether the touch capacitance data is within a nonlinear range to obtain a judgment result;
  performing, according to the judgment result, a corresponding compensation operation by use of the variation of the compensation capacitance value.

In an embodiment, step of performing, according to the judgment result, the corresponding compensation operation by use of the variation of the compensation capacitance value, comprises:
  if the touch capacitance data is within the nonlinear range, performing an accelerated compensation operation to the current compensation capacitance value by use of the variation of the compensation capacitance value.

In an embodiment, step of performing the accelerated compensation operation to the current compensation capacitance value by use of the variation of the compensation capacitance value comprises:
  calculating a target compensation capacitance value according to an expression $CnegNew = CnegInitial + Y \ast \Delta CnegValue$, where CnegNew denotes the target compensation capacitance value, CnegInitial denotes the current compensation capacitance value, $\Delta CnegValue$ denotes the variation of the compensation capacitance value, and Y is a parameter which is configured according to a correspondence relationship between the compensation capacitance value and the touch capacitance data;
  writing the target compensation capacitor value into a compensation capacitor address.

In an embodiment, step of performing, according to the judgment result, the corresponding compensation operation by use of the variation of the compensation capacitance value, comprises:
  if the touch capacitance data is not within the nonlinear range, performing a linear compensation operation to the current compensation capacitance value by use of the variation of the compensation capacitance value.

In an embodiment, step of performing the linear compensation operation to the current compensation capacitance value by use of the variation of the compensation capacitance value comprises:
  calculating a target compensation capacitance value according to an expression $CnegNew = CnegInitial + \Delta CnegValue$, wherein CnegNew denotes the target compensation capacitance value, CnegInitial denotes the current compensation capacitance value, and $\Delta CnegValue$ denotes the variation of the compensation capacitance value;
  writing the target compensation capacitor value into a compensation capacitor address.

In an embodiment, step of calculating the variation, which is required to adjust the touch capacitance data to the target value, of the compensation capacitance value, according to the configured compensation step value comprises:
  acquiring the target value which is predetermined;
  calculating a difference value between the touch capacitance data and the target value to obtain a touch capacitance difference value;
  according to the configured compensation step value, dividing the touch capacitance difference value by the compensation step value, so as to obtain the variation of the compensation capacitance value.

In an embodiment, before judging whether the touch capacitance data is within the nonlinear range, the method further comprises:
  obtaining a saturation value of the touch capacitance data;
  calculating, according to the saturation value, the nonlinear range of the touch capacitance data.

In an embodiment, step of judging whether the touch capacitance data is within the nonlinear range comprises:
  judging whether the touch capacitance data falls within an interval (RawSatur−X*CnegStep, RawSatur), where RawSatur denotes a saturation value, CnegStep denotes the compensation step value, and X is a parameter which is configured according to the correspondence relationship between the compensation capacitance value and the touch capacitance data.

In an embodiment, after performing, according to the judgment result, the corresponding compensation operation by use of the variation of the compensation capacitance value, the method further comprises:

repeatedly performing step of acquiring the touch capacitance data and the compensation operation according to a configured number of automatic compensation repetition times.

In an embodiment, step of repeatedly performing step of acquiring the touch capacitance data and the compensation operation according to the configured number of automatic compensation repetition times comprises:

when each time, except a last time, performing the compensation operation, reconfiguring the nonlinear range and a compensation degree according to the correspondence relationship between the current compensation capacitance value and the touch capacitance data;

when performing the compensation operation for the last time, linearly compensating the current compensation capacitance value.

In an alternative embodiment, step of calculating the variation, which is required to adjust the touch capacitance data to the target value, of the compensation capacitance value, according to the configured compensation step value comprises:

calculating a difference value between the touch capacitance data and the target value;

calculating the variation of the compensation capacitance value according to an expression $\Delta \text{CnegValue} = (\text{RawCur} - \text{RawDest})/\text{CnegStep}$, where RawCur denotes the touch capacitance data, RawDest denotes the target value, CnegStep denotes the compensation step value, and $\Delta \text{CnegValue}$ denotes the variation of the compensation capacitance value.

In an alternative embodiment, before calculating the variation, which is required to adjust the touch capacitance data to the target value, of the compensation capacitance value according to the configured compensation step value, the method further comprises:

obtaining a first touch data, a first compensation parameter corresponding to a first historical touch capacitance data, a second touch data and a second compensation parameter corresponding to a second historical touch capacitance data;

calculating the compensation step value according to an expression $|R2-R1|/|C2-C1|$, where R1 denotes the first touch data, R2 denotes the second touch data, C1 denotes the first compensation parameter, and C2 denotes the second compensation parameter.

On the other hand, according to an embodiment of the present disclosure, a device for adjusting a touch capacitance data is provided, and comprises:

a data acquisition module, configured to acquire the touch capacitance data;

a module for calculating a variation of a compensation capacitance value, configured to calculate the variation, which is required to adjust the touch capacitance data to a target value, of the compensation capacitance value, according to a configured compensation step value;

a nonlinearity judgment module, configured to judge whether the touch capacitance data is within a nonlinear range, so as to obtain a judgment result; and a capacitance compensation module, configured to perform a corresponding compensation operation by use of the variation of the compensation capacitance value according to the judgment result.

According to a third aspect, the present disclosure also provides an electronic device, comprising:

a processor;

a memory, configured to store instructions which are executable by the processor;

wherein the processor is configured to perform the method for adjusting the touch capacitance data according to embodiments of the present disclosure.

According to a fourth aspect, the present application also provides a computer-readable storage medium storing a computer program executable by a processor to complete the method for adjusting touch capacitance data according to embodiments of the present disclosure.

According to embodiments of the present disclosure, by acquiring a touch capacitance data, calculating a variation of a compensation capacitance value according to a compensation step value, then judging whether the touch capacitance data is within a nonlinear range to obtain a judgment result, and performing a corresponding compensation operation by use of the variation of the compensation capacitance value according to the judgment result, no matter what range the touch capacitance data is within, the touch capacitance data can be properly compensated and adjusted to the target value approximately, thus improving the accuracy of adjusting the touch capacitance data.

BRIEF DESCRIPTION OF THE DRAWINGS

In order to explain technical solutions according to the embodiments of the present disclosure more clearly, drawings corresponding to the embodiments of the present disclosure are briefly introduced below, wherein.

REFERENCE MARKS

100: touch device;
110: touch panel;
111: touch sensor;
120: controller;
121: processor;
122: memory;
510: data acquisition module;
520: module for calculating a variation of a compensation capacitance value;
530: nonlinearity judgment module;
540: capacitance compensation module.

DETAILED DESCRIPTION OF EMBODIMENTS OF THE DISCLOSURE

Technical solutions according to the embodiments of the present disclosure will be described below with reference to the drawings corresponding to the embodiments of the present disclosure.

Similar numerals and letters denote similar items in the drawings, and therefore, once an item is defined in one drawing, it does not need to be further defined and explained in a subsequent drawing. Meanwhile, in the description of the present disclosure, terms "first", "second" and the like are used only to distinguish descriptions and should not be understood to indicate or imply relative importance.

Figure 1:
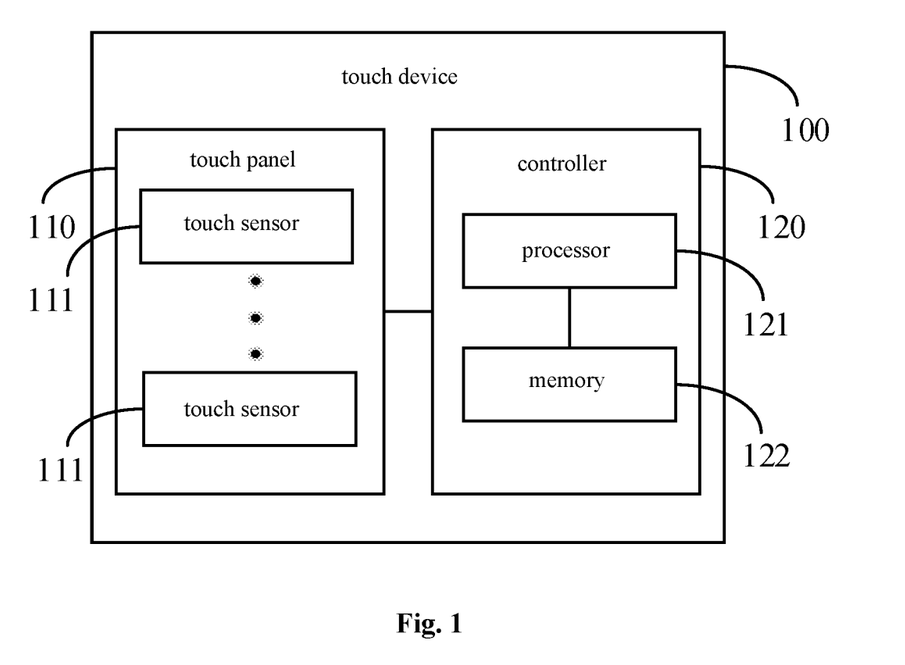
FIG. 1 shows a schematic diagram of an application scenario of a method for adjusting a touch capacitance data according to an embodiment of the present disclosure.

FIG. 1 shows a schematic diagram of an application scenario of a method for adjusting a touch capacitance data according to an embodiment of the present disclosure. As shown in FIG. 1, in the application scenario, a touch device 100 is comprised. The touch device 100 may be a mobile phone, a tablet computer or other device equipped with a touch panel. By adopting the method for adjusting the touch capacitance data according to the embodiment of the present disclosure, the touch device 100 can automatically adjust a compensation capacitance value of a corresponding touch sensor, thereby adjusting the touch capacitance data to being close to a target value and improving the accuracy of the adjusting the touch capacitance data.

The touch device 100 comprises a touch panel 110 and a controller 120. A plurality of touch sensors 111 are comprised in the touch panel. The controller 120 can be connected to the touch panel 110 and is configured to automatically adjust the touch capacitance data acquired by a corresponding touch sensor 111 by adopting the method for adjusting the touch capacitance data according to the embodiments of the present disclosure.

The present disclosure also provides an electronic device. The electronic device may be a controller 120. The controller 120 may comprise a processor 121 and a memory 122 configured to store instructions which are executable by the processor 121, wherein the processor 121 is configured to execute the method for adjusting the touch capacitance data according to the embodiments of the present disclosure.

The memory 122 may be implemented by any type of volatile or non-volatile storage device or a combination thereof, such as static random access memory (SRAM), electrically erasable programmable read-only memory (EEPROM), erasable programmable read-only memory (EPROM), programmable red-only memory (PROM), read-only memory (ROM), magnetic memory, flash memory, magnetic disk or optical disk.

The present disclosure also provides a computer readable storage medium configured to store a computer program executable by the processor 121 to complete the method for adjusting the touch capacitance data according to the embodiments of the present disclosure.

Figure 2:
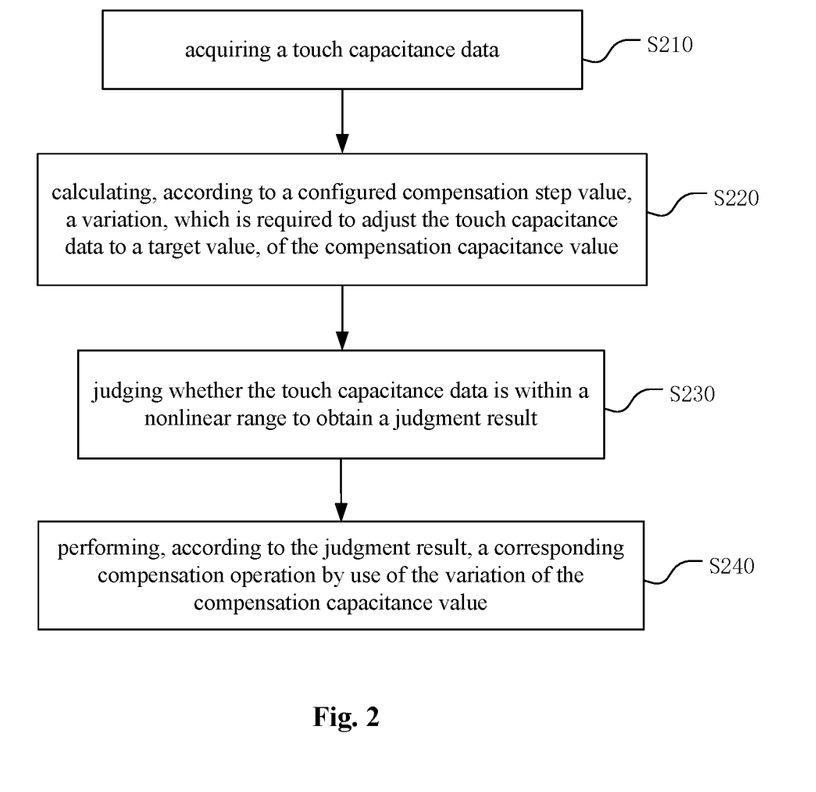
FIG. 2 shows a flow diagram of a method for adjusting the touch capacitance data according to an embodiment of the present disclosure.

FIG. 2 shows a flow diagram of a method for adjusting the touch capacitance data according to an embodiment of the present disclosure. As shown in FIG. 2, the method comprises following steps S210-S240.

In step S210: the touch capacitance data is acquired.

In general, in the touch device 100, in order to make a sensing value of the capacitance data of each touch sensor reach a certain value before that touch sensor is touched, a compensation capacitance value is usually set for adjusting the capacitance data. Therefore, the touch capacitance data according to the embodiment of the present disclosure is a sum of the capacitance data of a corresponding touch sensor on the touch panel before that touch sensor is touched and the corresponding compensation capacitance value. In this step, scanning is started to perform after the touch device 100 is powered on, so that the touch capacitance data can be acquired.

In step S220: according to a configured compensation step value, a variation, which is required to adjust the touch capacitance data to a target value, of the compensation capacitance value is calculated.

Wherein, the target value is preset, and in an embodiment, the target value may be a value close to most of the touch capacitance data on the touch panel 110; alternatively, the target value can be set according to an actual need. The variation of the compensation capacitance value is a variation, which is required to adjust the touch capacitance data to the target value, of the compensation capacitance value, based on the current compensation capacitance value.

It should be noted that within a certain range, the compensation capacitance value has a linearly variation relationship with the touch capacitance data. The compensation step value is a variation of the touch capacitance data for each unit increase of the compensation capacitance value within the linear variation range.

In an alternative embodiment, the compensation step value may be determined and configured by a following manner. A first touch data, a first compensation parameter corresponding to a first historical touch capacitance data, a second touch data and a second compensation parameter corresponding to a second historical touch capacitance data can be obtained first. Wherein, for the compensation capacitance of each touch sensor, in the corresponding linear variation range, the compensation capacitance value is firstly configured to a first compensation parameter C1, so as to obtain the first touch data R1 by acquiring the touch capacitance data at this time, and then the compensation capacitance value is configured to a second compensation parameter C2, so as to obtain the second touch data R2 by acquiring the touch capacitance data at this time. The compensation step value is calculated based on an expression $|R2-R1|/|C2-C1|$, where $|R2-R1|$ is an absolute value of R2−R1 and $|C2-C1|$ is an absolute value of C2−C1.

Thus, the variation of the compensation capacitance value satisfies an expression: $\Delta CnegValue=(RawCur-RawDest)/CnegStep$, where RawCur is the touch capacitance data, RawDest is the target value, CnegStep is the compensation step value, and $\Delta CnegValue$ is the variation of the compensation capacitance value.

In step S210, after the current touch capacitance data is acquired, the scanning is stopped firstly. In this step, according to the configured compensation step value, that is, according to the linear variation relationship between the compensation capacitance value and the touch capacitance data, the variation, which is required to adjust the touch capacitance data acquired in step S210 to the target value, of the compensation capacitance value is calculated under a linear condition.

In step S230: whether the touch capacitance data is within a nonlinear range is judged, so as to obtain a judgment result.

The nonlinear range refers to a specific range of the touch capacitance data, and the specific range is associated with the value of the touch capacitance data itself. Within this specific range, a correspondence relationship between the compensation capacitance value and the touch capacitance data is a nonlinear relationship. In this step, it is judged whether the current touch capacitance data is within the specific range.

In step S240: according to the judgment result, the corresponding compensation operation is performed by use of the variation of the compensation capacitance value.

The judgment result may indicate that, the touch capacitance data is within the nonlinear range or not within the nonlinear range. Since the correspondence relationship between the compensation capacitance value and the touch capacitance data is different in the two different ranges, the compensation degree for the current compensation capacitance value is also different in the two different ranges. According to these two kinds of judgment results, the current compensation capacitance value can be compensated by use of the variation of the compensation capacitance value.

In an embodiment, when the touch capacitance data is within the linear range, the current compensation capacitance value may be increased by one unit variation of the compensation capacitance value, and when the touch capacitance data is not within the linear range, the current compensation capacitance value may be increased by more than one unit variation of the compensation capacitance value.

According to the above embodiment of the present disclosure, by acquiring the touch capacitance data, calculating the variation of the compensation capacitance value according to the compensation step value, then judging whether the touch capacitance data is within the nonlinear range to obtain the judgment result, and performing the corresponding compensation operation by use of the variation of the compensation capacitance value according to the judgment result, no matter what range the touch capacitance data is within, the touch capacitance data can be properly compensated and adjusted to the target value approximately.

In an embodiment, the step of performing the corresponding compensation operation by use of the variation of the compensation capacitance value according to the judgment result, may comprise: performing an accelerated compensation operation to the current compensation capacitance value by use of the variation of the compensation capacitance value, if the touch capacitance data is within the nonlinear range. Wherein, the accelerated compensation operation refers to a compensation operation which is configured to compensate the current compensation capacitance value by use of a compensation value greater than the corresponding variation of the compensation capacitance value.

In an embodiment, the step of performing the accelerated compensation operation to the current compensation capacitance value by use of the variation of the compensation capacitance value may comprise: calculating the target compensation capacitance value according to an expression CnegNew=CnegInitial+Y*ΔCnegValue, where, CnegNew denotes a target compensation capacitance value, CnegInitial denotes the current compensation capacitance value, ΔCnegValue denotes the variation of the compensation capacitance value, Y is a parameter which is configured according to the correspondence relationship between the compensation capacitance value and the touch capacitance data, and the target compensation capacitance value is written into the compensation capacitance address.

Wherein, the target compensation capacitance value refers to an updated compensation capacitance value which is obtained after the current compensation operation is completed. In this step, Y is a parameter greater than 1, and Y can be configured according to the correspondence relationship between the compensation capacitance value and the touch capacitance data. Specifically, the larger a degree of nonlinearity between the compensation capacitance value and the touch capacitance data, the larger the Y is. The compensation capacitance address is pre-stored in the memory. In the step, the compensation capacitance address in the memory is obtained firstly, and then the target compensation capacitance value is written into the compensating capacitance address to complete the update of the compensating capacitance value.

In one embodiment, the step of performing the corresponding compensation operation by use of the variation of the compensation capacitance value according to the judgment result may also comprise: if the touch capacitance data is not within the nonlinear range, performing a linear compensation operation to the current compensation capacitance value by use of the variation of the compensation capacitance value. The linear compensation operation is configured to compensate the current compensation capacitance value by a value equal to the variation of the compensation capacitance value.

In an embodiment, the step of performing the linear compensation operation to the current compensation capacitance value by use of the variation of the compensation capacitance value may comprise: calculating the target compensation capacitance value according to an expression CnegNew=CnegInitial+ΔCnegValue, where, CnegNew denotes the target compensation capacitance value, CnegInitial denotes the current compensation capacitance value, and ΔCnegValue denotes the variation of the compensation capacitance value.

Different from the accelerated compensation operation, in the linear compensation operation, due to a linear relationship between the compensation capacitance value and the touch capacitance data within the linear range, the target compensation capacitance value can be obtained by directly adding the current compensation capacitance value with the corresponding variation of the compensation capacitance value. After the calculation of the target compensation capacitance value is completed, the target compensation capacitance value is written into the compensation capacitance address, so that the compensation capacitance value is updated.

Figure 3:
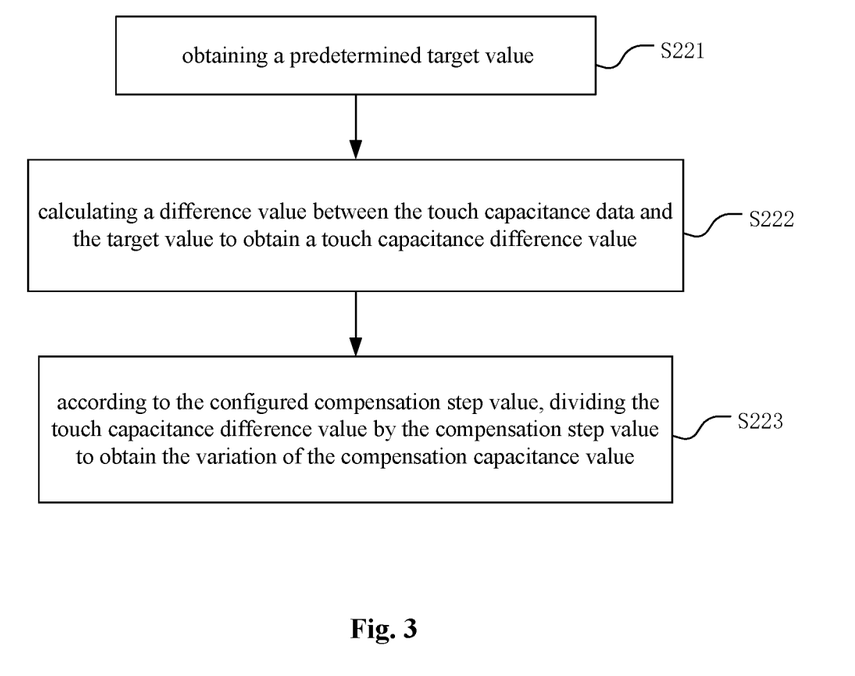
FIG. 3 shows a detailed flow diagram of step S220 in the corresponding embodiment shown in FIG. 2.

In an embodiment, as shown in FIG. 3, the above-mentioned step S220 for calculating the variation, which is required to adjust the touch capacitance data to the target value, of the compensation capacitance value according to the configured compensation step value, may comprise following steps S221-S223.

In step S221: a predetermined target value is obtained.

The target value may be set according to a historical empirical data and the target value may be an average value of the touch capacitance data acquired by all touch sensors on the touch panel 110 under a state that the touch sensors are not touched.

In step S222: a difference value between the touch capacitance data and the target value is calculated to obtain a touch capacitance difference value.

In step S223: according to the configured compensation step value, the touch capacitance difference value is divided by the compensation step value to obtain the variation of the compensation capacitance value.

In a practical application, the touch capacitance data decreases with an increase of compensation capacitance value. When the touch capacitance data is smaller than the target value, the touch capacitance difference value is negative, and the variation of the compensation capacitance value is also negative; conversely, when the touch capacitance data is larger than the target value, the touch capacitance difference value is positive and the variation of the compensation capacitance is also positive.

In an embodiment, before judging whether the touch capacitance data is within the nonlinear range in the above-mentioned step S230, the method provided according to the embodiment of the present disclosure may further comprise: obtaining a saturation value of the touch capacitance data; calculating, according to the saturation value, the nonlinear range of the touch capacitance data.

The saturation value refers to a specific value, and when the touch capacitance data reaches that specific value, the touch capacitance data will not change with the increase of the compensation capacitance value. In a range around the saturation value, the touch capacitance data has a nonlinear relationship with the variation of compensation capacitance value. According to the empirical data, the saturation value of the touch capacitance data is obtained, and the nonlinear range of the touch capacitance data can be calculated according to the saturation value.

In an embodiment, step S230 of judging whether the touch capacitance data is within the nonlinear range to obtain the judgment result may be implemented by judging whether the touch capacitance data falls within an interval (RawSatur−X*CnegStep, RawSatur), where RawSatur denotes the saturation value, CnegStep denotes the compensation step value, and X is a parameter configured according to the correspondence relationship between the compensation capacitance value and the touch capacitance data. Specifically, when the difference value between the touch capacitance data and the target value is relatively large, X can be configured to a large value correspondingly.

In other words, RawSatur−X*CnegStep can be regarded as a first threshold, and the saturation value RawSatur can be regarded as a second threshold, then, whether the touch capacitance data is greater than or equal to the first threshold and is less than or equal to the second threshold is judged, if so, then it is indicated that the touch capacitance data is closer to the saturation value, thus it can be determined that the touch capacitance data is within the nonlinear range; otherwise, it can be determined that the touch capacitance data is within the linear range.

In an embodiment, after the step S240 of performing the corresponding compensation operation by use of the variation of the compensation capacitance value according to the judgment result, the method according to the embodiment of the present disclosure may also comprise: repeatedly performing the step of acquiring the touch capacitance data and the compensation operation according to a configured number of automatic compensation repetition times.

The number of automatic compensation repetition times refers to a number of times that the compensation operation to the touch capacitance data is repeatedly performed. In this step, when one time of the compensation operation is completed, that is, after the target compensation capacitance value is written into the compensation capacitance address, scanning is started to obtain the updated touch capacitance data, and the compensation operation is performed again according to the touch capacitance data. A detailed process of the compensation operation can be described with reference to the above-mentioned embodiments and will not be described here.

In an embodiment, when each time, except the last time, the compensation operation is performed, the nonlinear range and a compensation degree according to the correspondence relationship between the current compensation capacitance value and the touch capacitance data can be reconfigured; and when the compensation operation is performed for the last time, the current compensation capacitance value is linearly compensated.

The compensation degree refers to a ratio between an actual variation of the compensation capacitance value and the calculated variation of the compensation capacitance value based on the variation of the compensation capacitance value. When the compensation operation is performed for the first time, the nonlinear relationship between the touch capacitance data and the compensation capacitance value is the strongest; when the compensation operation is performed for a second time, since the first time of the compensation operation has been completed, the nonlinear relationship between the touch capacitance data and the compensation capacitance value is weakened, and accordingly, the nonlinear range and the compensation degree can be reduced. For example, in an embodiment, X and Y according to the above embodiments may be reduced. When the compensation operation is performed for the last time, because the touch capacitance data may be overcompensated after a plurality of previous compensation operations, the compensation capacitance value is linearly compensated for the last time, so that the touch capacitance data which may have been partially overcompensated, can be restored to being close to the target value.

Figure 4:
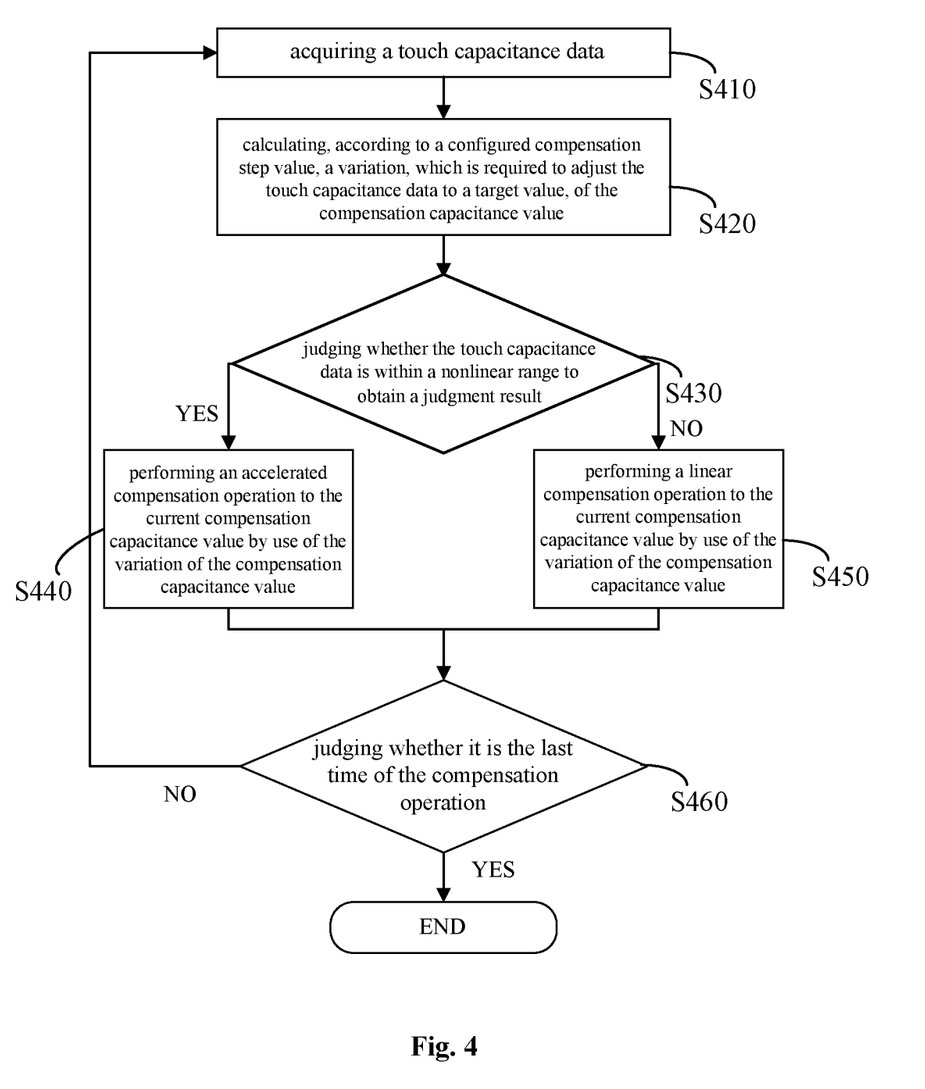
FIG. 4 shows a process diagram of a method for adjusting the touch capacitance data according to another embodiment of the present disclosure.

FIG. 4 shows a process diagram of a method of adjusting the touch capacitance data according to an embodiment of the present disclosure. The process comprises steps S410 to S460.

In step S410: the touch capacitance data is acquired.

In step S420: according to the configured compensation step value, the variation, which is required to adjust the touch capacitance data to the target value, of the compensation capacitance value is calculated.

In step S430: whether the touch capacitance data is within the nonlinear range is judged. If yes, then step S440 is executed; otherwise, step S450 is executed.

In step S440: by use of the variation of the compensation capacitance value, the accelerated compensation operation is performed to the current compensation capacitance value. The method of performing the accelerated compensation operation can refer to the above embodiments.

In step S450: by use of the variation of the compensation capacitance value, a linear compensation operation is performed to the current compensation capacitance value.

In step S460, whether it is the last time of the compensation operation is judged; if yes, then the process ends; otherwise, the process returns to step S410.

In an embodiment, as an example, 5 touch sensors on the touch panel are selected, it is assumed that the touch capacitance data corresponding to the 5 touch sensors are {900, 1000, 160, 240, 250}, and the compensation capacitance values corresponding to the 5 touch sensors are {5, 5, 5, 5, 5}, and each of the touch capacitance data and the compensation capacitance values is a normalized data obtained after pre-processing. The target value of the touch capacitance data is set to 1000, the saturation value is set to 2500, the compensation step value is set to 500, and the number of compensation operation times is set to 3.

In the first time of the compensation operation, the variation of the compensation capacitance value is calculated first. According to the method of calculating the variation of the compensation capacitance value in the corresponding embodiment as shown in FIG. 3, calculating expressions of the variations of the compensation capacitance values are {(900−1000)/500, (1000−1000)/500, (1600−1000)/500, (2400−1000)/500, (2500−1000)/500}, thus the variations of the compensation capacitance values are calculated as {−0.2, 0, 1.2, 2.8, 3}. Then, it is judged whether each the touch capacitance data is within a nonlinear range. According to a distance between the touch capacitance data and the target value, X can be configured to {0.5, 0.5, 0.8, 1.2, 1.2}, then, according to an interval (RawSatur−X*CnegStep, RawSatur) of the nonlinear range, the calculated nonlinear ranges are {(2250, 2500), (2250, 2500), (2100, 2500), (1900, 2500)}, respectively. Obviously, 2400 and 2500 are in the nonlinear range for acceleration compensation operation, and Y is selected to be 1.8 and 2, respectively; 900, 1000 and 1600 are in the linear range for linear compensation operation. According to a calculating expression (CnegNew=CnegInitial+Y*ΔCnegValue) of the target compensation capacitance value in the accelerated compensation operation and a calculating expression (CnegNew=CnegInitial+ΔCnegValue) of the target compensation capacitance value in linear compensation operation, updated compensation capacitance values are {4.8, 5, 6.2, 10.04, 11}. The touch capacitance data acquired by rescanning are {988, 1000, 105, 120, 1300}.

Then, the current compensation capacitance values are compensated for the second time in the same way, and the touch capacitance data acquired after compensation are {998, 1000, 10100, 1050, 1050}. For the last time, the current compensation capacitance values are linearly compensated, and the touch capacitance data acquired after compensation are {1001, 1000, 1006, 1003, 1009}. After three times of compensation operation, a difference between each touch capacitance data and the target value 1000 is less than 10, which meets the expectation.

A device embodiment of the present disclosure is described as follows, and can be configured to perform the above-mentioned method for adjusting touch capacitance data according to the embodiments of the present disclosure. Details, which are not disclosed in the device embodiment of the present disclosure, can be referred to refer to the method for adjusting touch capacitance data according to the embodiments of the present disclosure.

Figure 5:
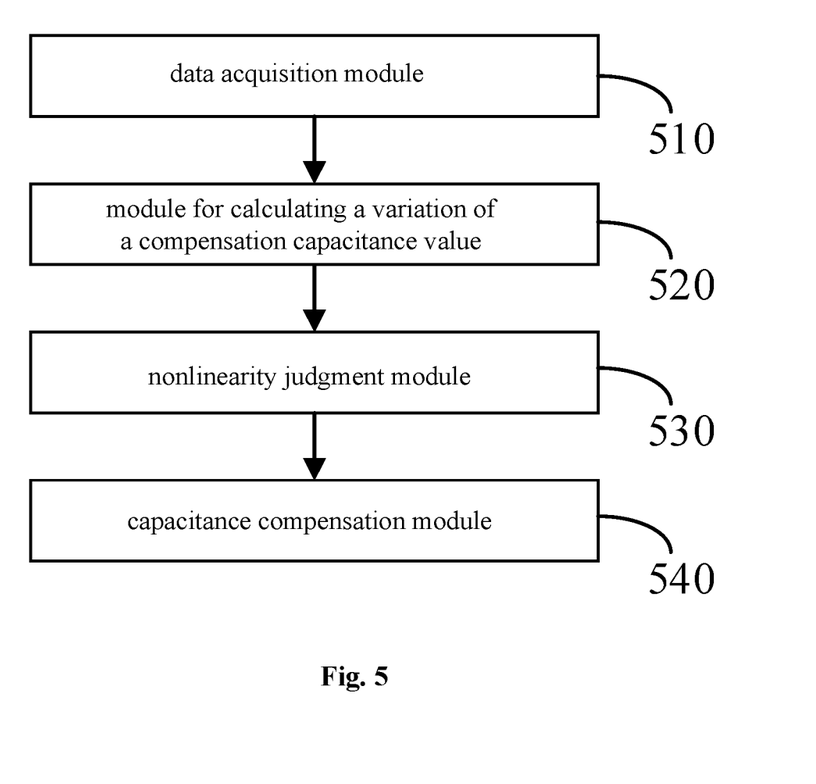
FIG. 5 shows a block diagram of a device for adjusting the touch capacitance data according to another embodiment of the present disclosure.

FIG. 5 shows a block diagram of a device for adjusting the touch capacitance data according to an embodiment of the present disclosure. The device comprises: a data acquisition module 510, a module 520 for calculating a variation of a compensation capacitance value, a nonlinearity judgment module 530 and a capacitance compensation module 540.

The data acquisition module 510 is configured to acquire the touch capacitance data.

The module 520 for calculating the variation of the compensation capacitance value is configured to calculate the variation, which is required to adjust the touch capacitance data to a target value, of the compensation capacitance value, according to a configured compensation step value.

The nonlinearity judgment module 530 is configured to judge whether the touch capacitance data is within a nonlinear range, so as to obtain a judgment result.

The capacitance compensation module 540 is configured to perform a corresponding compensation operation by use of the variation of the compensation capacitance value according to the judgment result.

The realization process of the functions of each module in the device is detailed in the realization process of the corresponding steps in the adjustment method of touch capacitance data, and will not be described here.

In several embodiments provided in the present disclosure, the disclosed device and method may also be implemented in other ways. The device embodiment described above is only illustrative, for example, the flowcharts and block diagrams in the drawings show the architectures, functions, and operations of possible implementations of the devices, methods, and computer program products according to various embodiments of the present disclosure. In this regard, each block in a flowchart or block diagram may represent a module, program segment, or part of code containing one or more executable instruction configured to perform a specified logical function. In some alternative implementations, the functions indicated in the blocks may also occur in a different order than those indicated in the drawings. For example, two successive blocks can actually be executed substantially in parallel, or they can sometimes be executed in reverse order, depending on an involved functionality. It should also be noted that each block in the block diagrams and/or flowcharts, and each combination of blocks in the block diagrams and/or flowcharts, may be implemented in a dedicated hardware-based system that performs a specified function or action, or may be implemented in a combination of dedicated hardware and computer instructions.

In addition, functional modules in an embodiment of the present disclosure may be integrated to form a stand-alone portion, or each functional module may exist separately, or two or more modules may be integrated to form a stand-alone portion.

A function may be stored in a computer-readable storage medium if implemented in a form of a software function module and sold or used as a stand-alone product. Based on this understanding, a technical proposal of the present disclosure, or a part that contributes to the prior art, or a part of the technical proposal, can be embodied in a form of a software product in essence, the computer software product is stored in a storage medium and includes instructions for controlling a computer device (which may be a personal computer, a server, a network device, etc.) to perform all or part of the steps of a method according to various embodiments of the present disclosure. The aforementioned storage medium includes a U disk, a removable hard disk, a Read-Only Memory (ROM), a Random Access Memory (RAM), a magnetic disk or an optical disk and other medium capable of storing program codes.

INDUSTRIAL PRACTICALITY

The present disclosure provides a method and device for adjusting a touch capacitance data, an electronic device and a storage medium, which can automatically adjust the touch capacitance data to being close to a target value and improve the accuracy of adjusting the touch capacitance data.

What is claimed is:

1. A method for adjusting a touch capacitance data, wherein the method is executed by a processor and comprises:
  acquiring the touch capacitance data;
  calculating a variation, to adjust the touch capacitance data to a target value, of a compensation capacitance value, according to a configured compensation step value;
  judging whether the touch capacitance data is within a nonlinear range of the touch capacitance data to obtain a judgment result, wherein the nonlinear range is a set range calculated according to a saturation value of the touch capacitance data;
  performing, according to the judgment result, a corresponding compensation operation by use of the variation of the compensation capacitance value; and
  adjusting the touch capacitance data of a corresponding touch sensor to the target value, according to the configured compensation step value,
  wherein the step of calculating the variation, to adjust the touch capacitance data to the target value, of the compensation capacitance value, according to the configured compensation step value comprises:
  acquiring the target value which is predetermined;
  calculating a difference value between the touch capacitance data and the target value to obtain a touch capacitance difference value;

according to the configured compensation step value, dividing the touch capacitance difference value by the compensation step value to obtain the variation of the compensation capacitance value.

2. The method according to claim 1, wherein before judging whether the touch capacitance data is within the nonlinear range, the method further comprises:
obtaining the saturation value of the touch capacitance data;
calculating, according to the saturation value, the nonlinear range of the touch capacitance data.

3. The method according to claim 1, wherein the step of judging whether the touch capacitance data is within the nonlinear range comprises:
judging whether the touch capacitance data falls within an interval (RawSatur−X*CnegStep, RawSatur), where RawSatur denotes a saturation value, CnegStep denotes the compensation step value, and X is a parameter which is configured according to the correspondence relationship between the compensation capacitance value and the touch capacitance data.

4. The method according to claim 1, wherein the step of calculating the variation, to adjust the touch capacitance data to the target value, of the compensation capacitance value, according to the configured compensation step value comprises:
calculating a difference value between the touch capacitance data and the target value;
calculating the variation of the compensation capacitance value according to an expression $\Delta CnegValue=(RawCur-RawDest)/CnegStep$, where RawCur denotes the touch capacitance data, RawDest denotes the target value, Cneg Step denotes the compensation step value, and $\Delta CnegValue$ denotes the variation of the compensation capacitance value.

5. The method according to claim 1, wherein before calculating the variation, to adjust the touch capacitance data to the target value, of the compensation capacitance value according to the configured compensation step value, the method further comprises:
obtaining a first touch data, a first compensation parameter corresponding to a first historical touch capacitance data, a second touch data and a second compensation parameter corresponding to a second historical touch capacitance data;
calculating the compensation step value according to an expression $|R2-R1|/|C2-C1|$, where R1 denotes the first touch data, R2 denotes the second touch data, C1 denotes the first compensation parameter, and C2 denotes the second compensation parameter.

6. An electronic device, comprising:
a processor;
a memory, configured to store instructions which are executable by the processor;
wherein the processor is configured to perform the method for adjusting the touch capacitance data according to claim 1.

7. The method according to claim 1, wherein the step of performing, according to the judgment result, the corresponding compensation operation by use of the variation of the compensation capacitance value, comprises:
if the touch capacitance data is within the nonlinear range, performing an accelerated compensation operation to the current compensation capacitance value by use of the variation of the compensation capacitance value, wherein the accelerated compensation operation is configured to compensate the current compensation capacitance value by use of a compensation value greater than the variation of the compensation capacitance value.

8. The method according to claim 7, wherein the step of performing the accelerated compensation operation to the current compensation capacitance value by use of the variation of the compensation capacitance value comprises:
calculating a target compensation capacitance value according to an expression $CnegNew=CnegInitial+Y*\Delta CnegValue$, where CnegNew denotes the target compensation capacitance value, CnegInitial denotes the current compensation capacitance value, $\Delta CnegValue$ denotes the variation of the compensation capacitance value, and Y is a parameter which is configured according to a correspondence relationship between the compensation capacitance value and the touch capacitance data;
writing the target compensation capacitor value into a compensation capacitor address.

9. The method according to claim 1, wherein the step of performing, according to the judgment result, the corresponding compensation operation by use of the variation of the compensation capacitance value, comprises:
if the touch capacitance data is not within the nonlinear range, performing a linear compensation operation to the current compensation capacitance value by use of the variation of the compensation capacitance value.

10. The method according to claim 9, wherein the step of performing the linear compensation operation to the current compensation capacitance value by use of the variation of the compensation capacitance value comprises:
calculating a target compensation capacitance value according to an expression $CnegNew=CnegInitial+\Delta CnegValue$, where CnegNew denotes the target compensation capacitance value, CnegInitial denotes the current compensation capacitance value, and $\Delta CnegValue$ denotes the variation of the compensation capacitance value;
writing the target compensation capacitor value into a compensation capacitor address.

11. The method according to claim 1, wherein after performing, according to the judgment result, the corresponding compensation operation by use of the variation of the compensation capacitance value, the method further comprises:
repeatedly performing a step of acquiring the touch capacitance data and the compensation operation according to a configured number of automatic compensation repetition times.

12. The method according to claim 11, wherein the step of repeatedly performing the step of acquiring the touch capacitance data and the compensation operation according to the configured number of automatic compensation repetition times comprises:
when each time, except a last time, performing the compensation operation, reconfiguring the nonlinear range and a compensation degree according to the correspondence relationship between the current compensation capacitance value and the touch capacitance data;
when performing the compensation operation for the last time, linearly compensating the current compensation capacitance value.

13. A device for adjusting a touch capacitance data, wherein the device comprises:
a data acquisition module, configured to acquire the touch capacitance data;

a module for calculating a variation of a compensation capacitance value, configured to calculate the variation, to adjust the touch capacitance data to a target value, of the compensation capacitance value, according to a configured compensation step value;

a nonlinear judgment module, configured to judge whether the touch capacitance data is within a nonlinear range of the touch capacitance data, so as to obtain a judgment result, wherein the nonlinear range is a set range calculated according to a saturation value of the touch capacitance data;

a capacitance compensation module, configured to perform a corresponding compensation operation by use of the variation of the compensation capacitance value according to the judgment result, wherein the data acquisition module, the module for calculating the variation of the compensation capacitance value, the nonlinear judgment module and the capacitance compensation module are implemented based on a processor, wherein the module for calculating a variation of a compensation capacitance value is configured to:

acquire the target value which is predetermined;

calculate a difference value between the touch capacitance data and the target value to obtain a touch capacitance difference value;

according to the configured compensation step value, divide the touch capacitance difference value by the compensation step value to obtain the variation of the compensation capacitance value;

wherein the touch capacitance data of a corresponding touch sensor is adjusted to the target value, according to the configured compensation step value.

* * * * *